(12) United States Patent
Kumar et al.

(10) Patent No.: US 12,485,745 B2
(45) Date of Patent: Dec. 2, 2025

(54) DEVICE FOR SHUTTING OFF AN AIR FLOW FOR A MOTOR VEHICLE FRONT END, COMPRISING A PLURALITY OF SUPPORT FRAMES

(71) Applicant: VALEO SYSTEMES THERMIQUES, La Verriere (FR)

(72) Inventors: Vijendra Kumar, Chennai (IN); Vladimir Szegeny, Prague (CZ); Frederic Vacca, La Verriere (FR); Sebastien Velasco, Chennai (IN)

(73) Assignee: VALEO SYSTEMES THERMIQUES, La Verriere (FR)

( * ) Notice: Subject to any disclaimer, the term of this patent is extended or adjusted under 35 U.S.C. 154(b) by 348 days.

(21) Appl. No.: 18/247,979

(22) PCT Filed: Sep. 27, 2021

(86) PCT No.: PCT/EP2021/076547
§ 371 (c)(1),
(2) Date: Apr. 5, 2023

(87) PCT Pub. No.: WO2022/073793
PCT Pub. Date: Apr. 14, 2022

(65) Prior Publication Data
US 2023/0382216 A1    Nov. 30, 2023

(30) Foreign Application Priority Data

Oct. 7, 2020 (FR) .................................... 2010226

(51) Int. Cl.
*B60K 11/08* (2006.01)
(52) U.S. Cl.
CPC ................. *B60K 11/085* (2013.01)

(58) Field of Classification Search
CPC ............................ B60K 11/085; B60K 11/08
See application file for complete search history.

(56) References Cited

U.S. PATENT DOCUMENTS

| 8,517,130 B2* | 8/2013 | Sakai | F01P 7/10 |
|---|---|---|---|
| | | | 180/68.1 |
| 10,100,707 B2* | 10/2018 | Wolf | B60K 11/085 |
| 2010/0243351 A1 | 9/2010 | Sakai | |

FOREIGN PATENT DOCUMENTS

| DE | 102017219420 A1 | 5/2019 |
|---|---|---|
| EP | 3109083 A1 | 12/2016 |

(Continued)

OTHER PUBLICATIONS

European Patent Office, International Search Report (with English translation) and Written Opinion of corresponding International Application No. PCT/EP2021/076547, dated Mar. 7, 2022.

*Primary Examiner* — John D Walters
(74) *Attorney, Agent, or Firm* — Osha Bergman Watanabe & Burton LLP

(57) ABSTRACT

A shut-off device for an air intake of a motor vehicle front end, including: a first support frame having four sidewalls, a second support frame having four sidewalls, at least one flap arranged within each of the first and second support frames and pivoting about a pivot axis between a first open end position and a second closed end position, the first and the second support frame being fastened mechanically to one another at one of their sidewalls, termed fixing sidewalls, the first and the second support frames each including at least one drive device dedicated to moving the at least one flap.

10 Claims, 13 Drawing Sheets

(56) References Cited

FOREIGN PATENT DOCUMENTS

EP 3210811 A1 8/2017
FR 3082881 A1 12/2019

\* cited by examiner

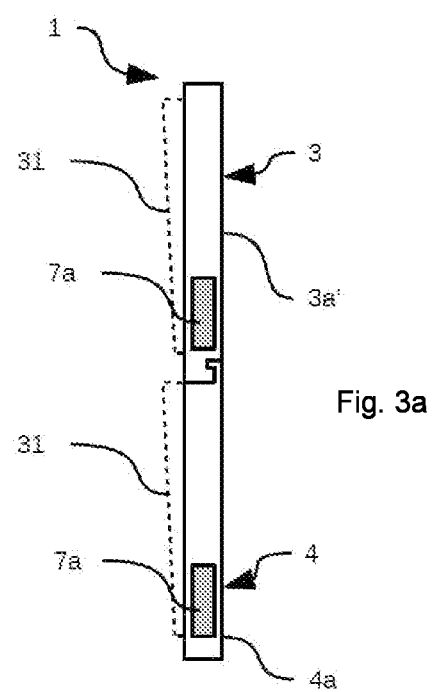

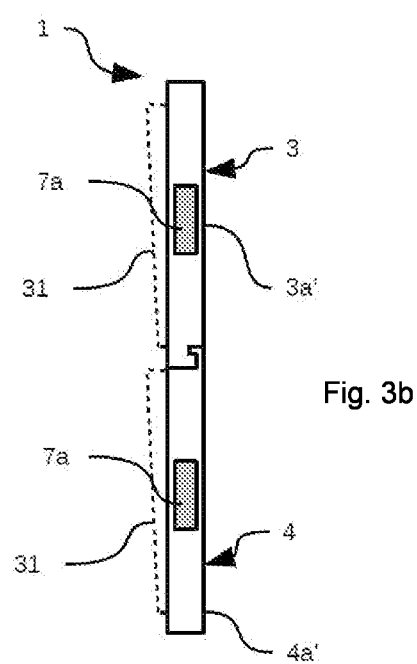

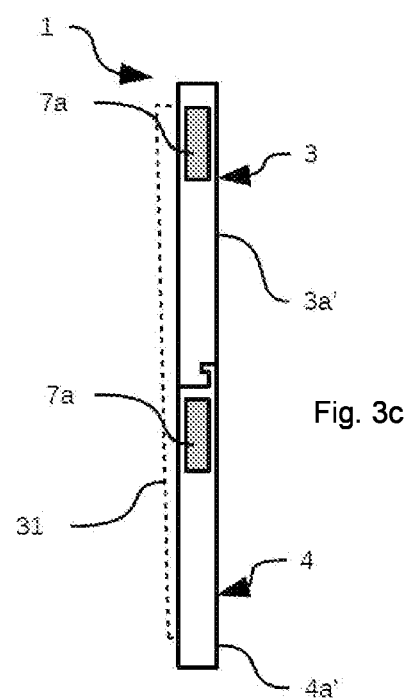

DEVICE FOR SHUTTING OFF AN AIR FLOW FOR A MOTOR VEHICLE FRONT END, COMPRISING A PLURALITY OF SUPPORT FRAMES

TECHNICAL FIELD

The present invention relates to the field of devices for shutting off an air flow for a motor vehicle front end.

BACKGROUND OF THE INVENTION

The front ends of motor vehicles generally have one or more main air intakes, through which an air flow enters, bound for the front compartment of the motor vehicle. Heat exchangers of the motor vehicle, such as for example the one that is used for air conditioning the car interior and/or the one that is used for cooling the engine, are generally placed behind these air intakes.

It is likewise known practice to dispose, in the path of air passing through the main air intakes, a support frame having one or more pivotably mounted flaps, which are able to assume a multiplicity of different angular positions between an open position and a shut-off position, thus forming a shut-off device, which is similar to a louver blind. This shut-off device is sometimes referred to as active grille shut-off device, or controlled air intake module. Such a shut-off device can likewise be referred to as AGS (standing for active grille shutter).

The shut-off device makes it possible to adjust the flow rate of air passing through the air intakes and arriving at the heat exchangers. It is thus possible to optimize the effectiveness of these heat exchangers, depending on requirements, by varying the amount of air that they receive. In addition, at high speed, having the flaps in the shut-off position makes it possible to reduce the drag coefficient of the motor vehicle, and thus improve the aerodynamics of said motor vehicle. The shut-off device thus makes it possible to reduce energy consumption and pollution if the engine does not need to be cooled by air from the outside.

In general, the motor vehicle has two main air intakes on its front end. Specifically, a lower air intake and an upper air intake, which are separated generally by a bumper beam. The shut-off device then generally has two support frames disposed respectively opposite each of the main air intakes. This type of shut-off device generally has a single and unique actuator in order to pivot the flaps of the two support frames. It is thus difficult, or even impossible, to control the flaps of the various support frames independently. In addition, generally these support frames are independent of one another, this possibly complicating the mounting and the connection of the shut-off device within the motor vehicle.

SUMMARY OF THE INVENTION

One of the objects of the present invention is therefore to at least partially overcome the disadvantages of the prior art and to propose an improved shut-off device having multiple support frames.

The present invention therefore relates to a device for shutting off an air intake of a motor vehicle front end, comprising:
a first support frame having four sidewalls,
a second support frame having four sidewalls,
at least one flap which is disposed within each of the first and second support frames and is able to pivot about a pivot axis between a first, open, end position and a second, closed, end position,
the first and the second support frame being mechanically fixed to one another at one of their sidewalls, referred to as fixing sidewall,
the first and the second support frame each having at least one drive device dedicated to moving the at least one flap that each of said first and second support frames have.

According to one aspect of the invention, the first and the second support frame each have two lateral uprights, an upper end crossmember and a lower end crossmember, said end crossmembers connecting said lateral uprights,
the lower end crossmember of the first support frame being fixed directly to the upper end crossmember of the second support frame.

According to another aspect of the invention, the fixing sidewalls of the first and the second support frame have complementary shapes.

According to another aspect of the invention, the fixing sidewalls of the first and the second support frame have an interlocking device having a male member complementary to a female member.

According to another aspect of the invention, the male member is at least one protruding bead extending parallel to the fixing sidewall, and the female member is at least one receiving recess in which the at least one protruding bead is inserted.

According to another aspect of the invention, the at least one protruding bead is disposed on the fixing sidewall of the first frame and the at least one receiving recess is disposed on the fixing sidewall of the second frame.

According to another aspect of the invention, the at least one protruding bead is disposed on a front face of the support frame which bears it and in that the at least one receiving recess is disposed on a rear face of the support frame which bears it.

According to another aspect of the invention, the fixing sidewalls of the first and the second support frame are fixed to one another by a fixing means opposing one fixing sidewall being pulled out of the other from the rear.

According to another aspect of the invention, the fixing sidewalls of the first and the second support frame are fixed to one another by means of screws.

According to another aspect of the invention, the screws are screwed in from the rear of the shut-off device.

According to another aspect of the invention, the flaps are connected to the first and second support frames by at least one pivot connection having an open insertion recess disposed on one of the faces of the support frames and intended to receive the pivot axis of the at least one flap,
the shut-off device furthermore having
a retaining bar which covers the aperture of the receiving recess and is intended to retain the pivot axis of the at least one flap within said receiving recess, and
at least two guides which are aligned and disposed so as to retain the retaining bar above the aperture of the receiving recess, the retaining bar being inserted in the at least two guides by sliding it from one of the sidewalls of the support frames.

According to another aspect of the invention, the retaining bar is shared by the first and second frames.

According to another aspect of the invention, the first and the second frame each have an individual retaining bar.

According to another aspect of the invention, at least one of the drive devices has an actuator disposed on the lower part of one of the lateral uprights of the first and second frames.

According to another aspect of the invention, at least one of the drive devices has an actuator disposed on the intermediate part of one of the lateral uprights of the first and second frames.

According to another aspect of the invention, at least one of the drive devices has an actuator disposed on the upper part of one of the lateral uprights of the first and second frames.

According to another aspect of the invention, the first and the second support frame have identical dimensions.

According to another aspect of the invention, the first and the second support frame have different dimensions.

BRIEF DESCRIPTION OF DRAWINGS

Further features and advantages of the present invention will become more clearly apparent from reading the following description, which is given by way of non-limiting illustration, and with reference to the accompanying drawings, in which:

FIG. 3a shows a schematic depiction, in a side view, of a shut-off device according to a first embodiment;

FIG. 3b shows a schematic depiction, in a side view, of a shut-off device according to a second embodiment;

FIG. 3c shows a schematic depiction, in a side view, of a shut-off device according to a third embodiment;

DETAILED DESCRIPTION OF THE INVENTION

In these figures, identical elements bear the same reference numbers.

The following embodiments are examples. Although the description refers to one or more embodiments, this does not necessarily mean that each reference relates to the same embodiment, or that the features apply only to a single embodiment. Individual features of different embodiments can also be combined and/or interchanged to provide other embodiments.

In the present description, certain elements or parameters can be indexed, such as, for example, first element or second element and also first parameter and second parameter or else first criterion and second criterion, etc. In this case, it is a matter of simple indexing to differentiate and designate elements or parameters or criteria that are similar but not identical. This indexing does not imply priority being given to one element, parameter or criterion over another and such designation can be interchanged easily without departing from the scope of the present description. Neither does this indexing imply a chronological order, for example in evaluating any given criterion.

In the following description, the terms "upper" and "lower" refer to the disposition of elements on the device for shutting off the front end air intake in the mounted state of the shut-off device on the motor vehicle.

Figure 1:
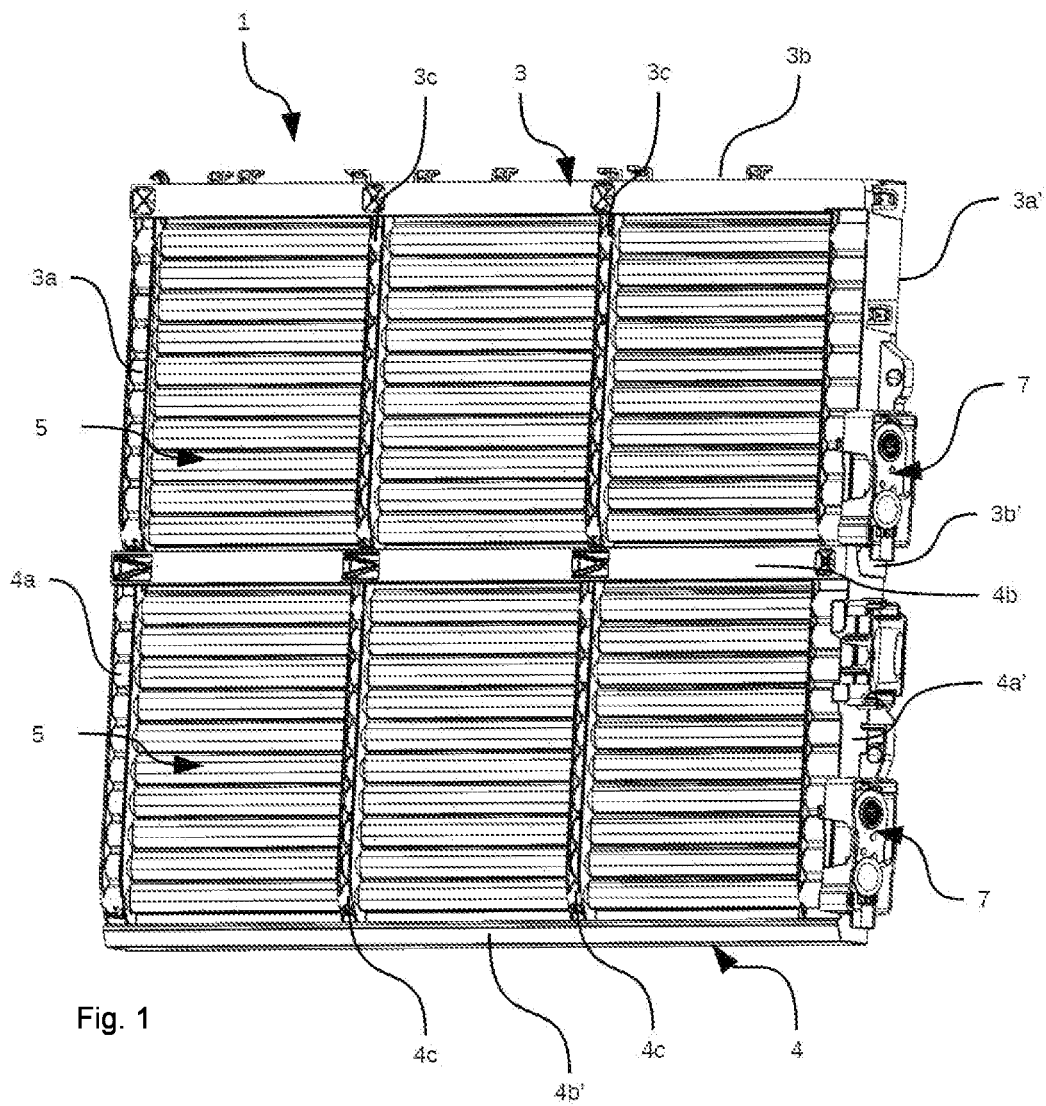
FIG. 1 shows a schematic depiction, in perspective, of the front face of a shut-off device.
Figure 2:
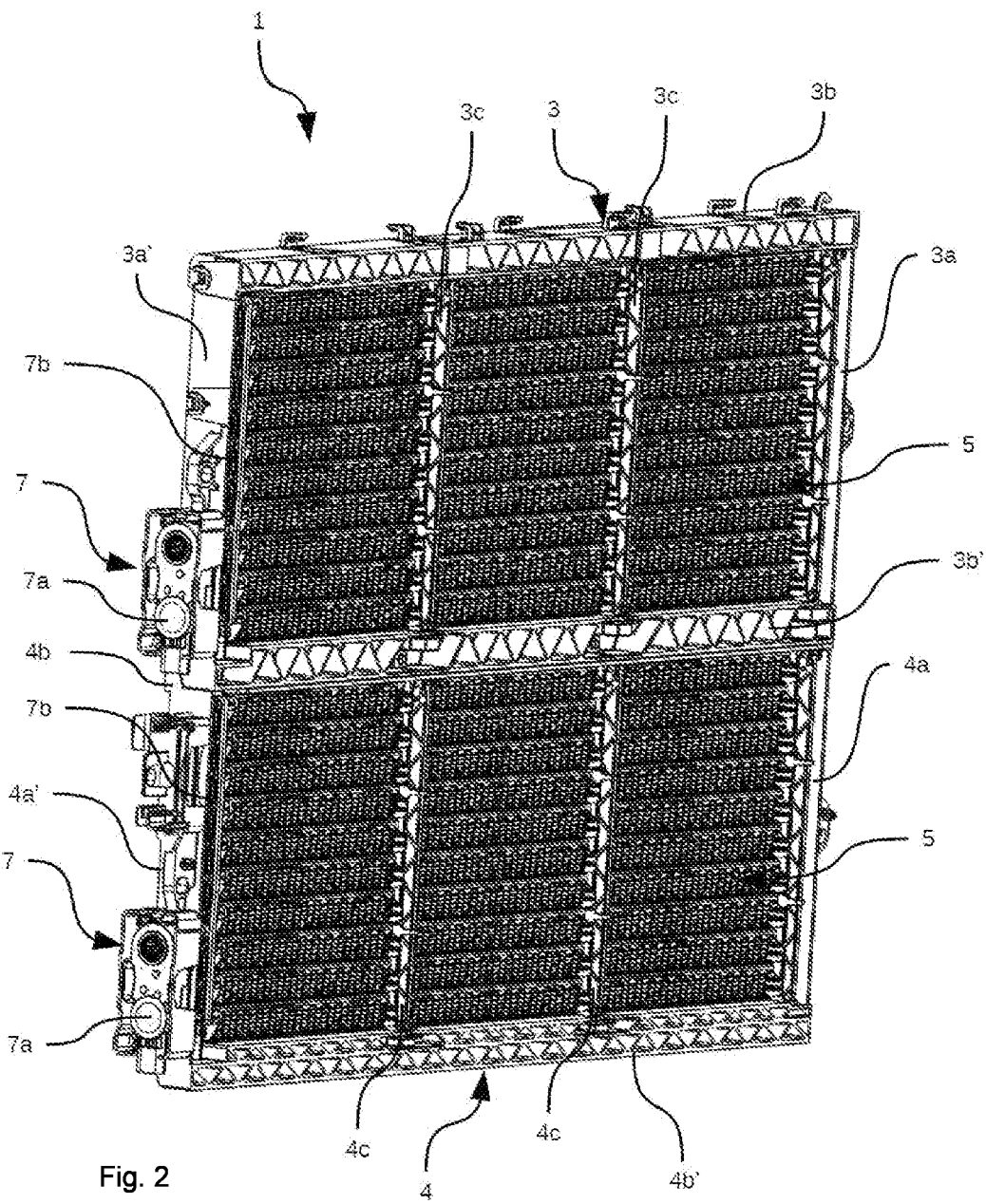
FIG. 2 shows a schematic depiction, in perspective, of the rear face of a shut-off device.

FIGS. 1 and 2 show the front face and rear face, respectively, of a shut-off device 1 for the air intake for a motor vehicle front end. In this case, front face is understood to mean the face of the shut-off device 1 that is intended to face the front of the motor vehicle. In this case, rear face is understood to mean the face of the shut-off device 1 that is opposite to the front face and is intended to face the rear of the motor vehicle.

The shut-off device 1 comprises a first support frame 3 having four sidewalls 3a, 3a', 3b, 3b'. These sidewalls 3a, 3a', 3b, 3b' can notably have two lateral uprights 3a, 3a' and two end crossmembers 3b, 3b' connecting the two lateral uprights 3a, 3a' to one another, thus defining an aperture of the first support frame 3. The first support frame 3 then has a rectangular overall shape. More particularly, the first support frame 3 has an upper end crossmember 3b and a lower end crossmember 3b', these orientations arbitrarily corresponding to the disposition of the shut-off device 1 when mounted in the motor vehicle. The upper end crossmember 3b will then be disposed facing the top of the motor vehicle and the lower end crossmember 3b', for its part, will be disposed facing the bottom of the motor vehicle.

The first support frame 3 can also have at least one intermediate upright 3c, which is parallel to the lateral uprights 3a, 3a' and connects the end crossmembers 3b, 3b'. This intermediate upright 3c more particularly connects the upper end crossmember 3b to the lower end crossmember 3b' within the aperture of the first support frame 3. In the example presented in FIGS. 1 and 2, the aperture of the first support frame 3 is divided into three by two intermediate uprights 3c.

The first support frame 3 has at least one flap 5 disposed on the inside of the aperture. The flap(s) 5 are mounted so as to be able to pivot about a pivot axis P (visible in FIGS. 7 and 8) between a first, open, end position (which is not shown and a second, closed, end position (visible in FIGS. 1 and 2). When the flap(s) 5 are in their first, open, end position, the flow of air can pass through the aperture of the first support frame 3. When the flap(s) 5 are in their second, closed, end position, the flap(s) 5 shut off the aperture of the first support frame 3 and oppose the passage of the flow of air.

Still in the example illustrated in FIGS. 1 and 2, the first support frame 3 has a plurality of flaps 5 forming at least one set of flaps 5 which are disposed parallel to one another in one and the same plane and are adjacent. In the present case, the first support frame 3 has a single set of flaps 5 disposed in the aperture of the first support frame 3. The flaps 5 are notably disposed horizontally and one above another, parallel to the end crossmembers 3b, 3b'. The flaps 5 then form a pivot connection with the lateral uprights 3a, 3a'. In this case, the intermediate uprights 3c act as support in order to keep the flaps 5 straight and stop them from bending under their own weight. The flaps 5 thus likewise form a pivot connection with these lateral uprights 3c.

The shut-off device 1 also comprises a second support frame 4 having four sidewalls 4a, 4a', 4b, 4b'. These sidewalls 4a, 4a', 4b, 4b' can notably have two lateral uprights 4a, 4a' and two end crossmembers 4b, 4b' connecting the two lateral uprights 4a, 4a' to one another, thus defining an aperture of the second support frame 4. The second support frame 4 then has a rectangular overall shape. More particularly, the second support frame 4 has an upper end crossmember 4b and a lower end crossmember 4b', these orientations arbitrarily corresponding to the disposition of the shut-off device 1 when mounted in the motor vehicle. The upper end crossmember 4b will then be disposed facing the top of the motor vehicle and the lower end crossmember 4b', for its part, will be disposed facing the bottom of the motor vehicle.

The second support frame 4 can also have at least one intermediate upright 4c, which is parallel to the lateral uprights 4a, 4a' and connects the end crossmembers 4b, 4b'. This intermediate upright 4c more particularly connects the upper end crossmember 4b to the lower end crossmember 4b' within the aperture of the second support frame 4. In the example presented in FIGS. 1 and 2, the aperture of the second support frame 4 is divided into three by two intermediate uprights 4c.

The second support frame 4 has at least one flap 5 disposed on the inside of the aperture. The flap(s) 5 are mounted so as to be able to pivot about a pivot axis P (visible in FIGS. 7 and 8) between a first, open, end position (which is not shown) and a second, closed, end position (visible in FIGS. 1 and 2). When the flap(s) 5 are in their first, open, end position, the flow of air can pass through the aperture of the first support frame 3. When the flap(s) 5 are in their second, closed, end position, the flap(s) 5 shut off the aperture of the first support frame 3 and oppose the passage of the flow of air.

Still in the example illustrated in FIGS. 1 and 2, the second support frame 4 has a plurality of flaps 5 forming at least one set of flaps 5 which are disposed parallel to one another in one and the same plane and are adjacent. In the present case, the second support frame 4 has a single set of flaps 5 disposed in the aperture of the second support frame 4. The flaps 5 are notably disposed horizontally and one above another, parallel to the end crossmembers 4b, 4b'. The flaps 5 then form a pivot connection with the lateral uprights 4a, 4a'. In this case, the intermediate uprights 4c act as support in order to keep the flaps 5 straight and stop them from bending under their own weight. The flaps 5 thus likewise form a pivot connection with these lateral uprights 3c.

Moreover, the first 3 and the second 4 support frame each have at least one drive device 7 dedicated to moving the flap(s) 5 that each of said first 3 and second 4 support frames have. These drive devices 7 (visible in FIGS. 1 and 2) are configured to control the positioning, and hence the pivoting, of the flap(s) 5 between their first, open, end position and their second, closed, end position.

The drive device 7 notably has an actuator 7a, for example an electric motor, and a control member 7b (which are visible in FIG. 2). In the example illustrated in FIGS. 1 and 2, the actuator 7a is connected directly to a control member 7b, for example a link rod, by a lever (not visible), the control member 7b for its part also being connected to each flap 5. Rotating the actuator 7a then makes the control member 7b move in translation in order to simultaneously pivot the flap(s) 5. Further methods for transmitting the rotational movements of the actuator 7a to the set of flaps 5 are entirely conceivable.

Still in the example illustrated in FIGS. 1 and 2, the drive device 7 is disposed on one of the lateral uprights 3a, 3a', 4a, 4a' of the first 3 and second 4 support frames 4 in order to be able to pivot the flap(s) 5 at the same time.

Using dedicated drive devices 7 for each support frame 3 and 4 makes it possible to individually control the flap(s) of each support frame 3 and 4. This can be particularly advantageous for the purpose of limiting the flow of air passing through the shut-off device 1, for example, when the vehicle is moving. This thus potentially makes it possible to improve the aerodynamic coefficient and therefore the consumption of the vehicle whilst still making it possible for a flow of air to pass through one of the support frames 3 or 4 to reach the heat exchangers disposed downstream of the shut-off device 1.

As shown in FIGS. 3a, 3b and 3c, the drive devices 7 and more specifically their actuators 7a can be disposed at different levels on the lateral uprights 3a, 3a', 4a, 4a' depending on requirements, notably depending on the space constraints within the motor vehicle.

In FIG. 3a, the drive devices 7 each have an actuator 7a disposed on the lower part of one of the lateral uprights 3a, 3a', 4a, 4a' of the first 3 and second 4 frames. In this case, lower part is understood to mean that part of the lateral upright 3a, 3a', 4a, 4a' that is closest to the lower end crossmember 3b', 4b'.

In FIG. 3b, the drive devices 7 each have an actuator 7a disposed on the intermediate part of one of the lateral uprights 3a, 3a', 4a, 4a' of the first 3 and second 4 frames. In this case, intermediate part is understood to mean that part of the lateral upright 3a, 3a', 4a, 4a' that is located between the upper end crossmember 3b, 4b and the lower end crossmember 3b', 4b'.

In FIG. 3c, the drive devices 7 each have an actuator 7a disposed on the upper part of one of the lateral uprights 3a, 3a', 4a, 4a' of the first 3 and second 4 frames. In this case, upper part is understood to mean that part of the lateral upright 3a, 3a', 4a, 4a' that is closest to the upper end crossmember 3b, 4b.

In FIGS. 3a, 3b and 3c, the actuators 7a of the drive devices 7 of each support frame 3, 4 are on similar parts of a lateral upright 3a, 3a', 4a, 4a'. However, it is entirely possible to imagine an embodiment in which the actuators 7a of each support frame 3, 4 are on distinct parts of a lateral upright 3a, 3a', 4a, 4a'.

As shown in FIGS. 1 and 2, the first 3 and the second 4 support frame are mechanically fixed directly to one another at one of their sidewalls 3a, 3a', 3b, 3b' and 4a, 4a', 4b, 4b', referred to as fixing sidewall. This direct fixing of the support frames 3 and 4 to one another makes it easier to place the shut-off device 1 within the motor vehicle. The use of two support frames 3 and 4 fixed directly to one another is also particularly advantageous for large shut-off devices 1, for example for vehicles such as trucks. This is because such a configuration makes it possible to limit the risk of the flaps 5 deforming or breaking owing to the large size of the shut-off device 1 and the pressure of the air. Moreover, each support frame 3, 4 having a dedicated drive device 7 makes it possible to simplify the connections and attachments in the course of this placement.

The first 3 and the second 4 support frame are preferably fixed one above the other. What is meant by this is that the lower end crossmember 3b' of the first support frame 3 is fixed directly to the upper end crossmember 4b of the second support frame 4. This notably makes it possible to place each support frame 3 and 4 respectively facing a lower air intake and an upper air intake of the front end of the motor vehicle.

Figure 4:
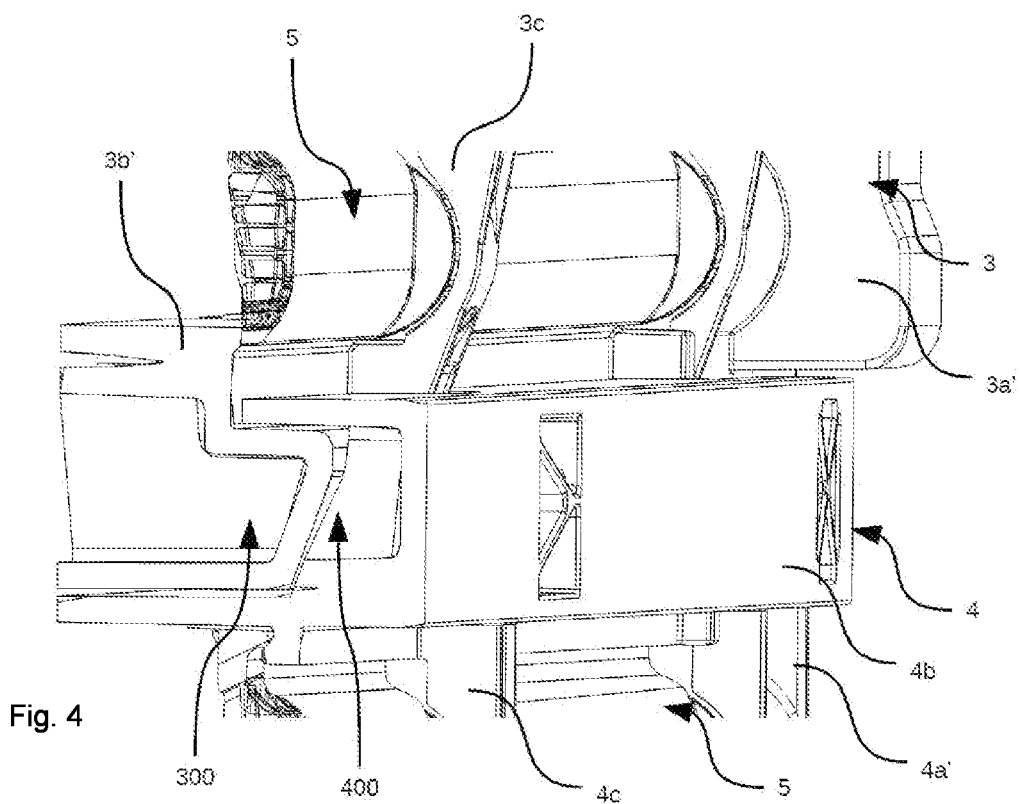
FIG. 4 shows a schematic depiction, in perspective and in section, of the connection between two support frames.
Figure 5:
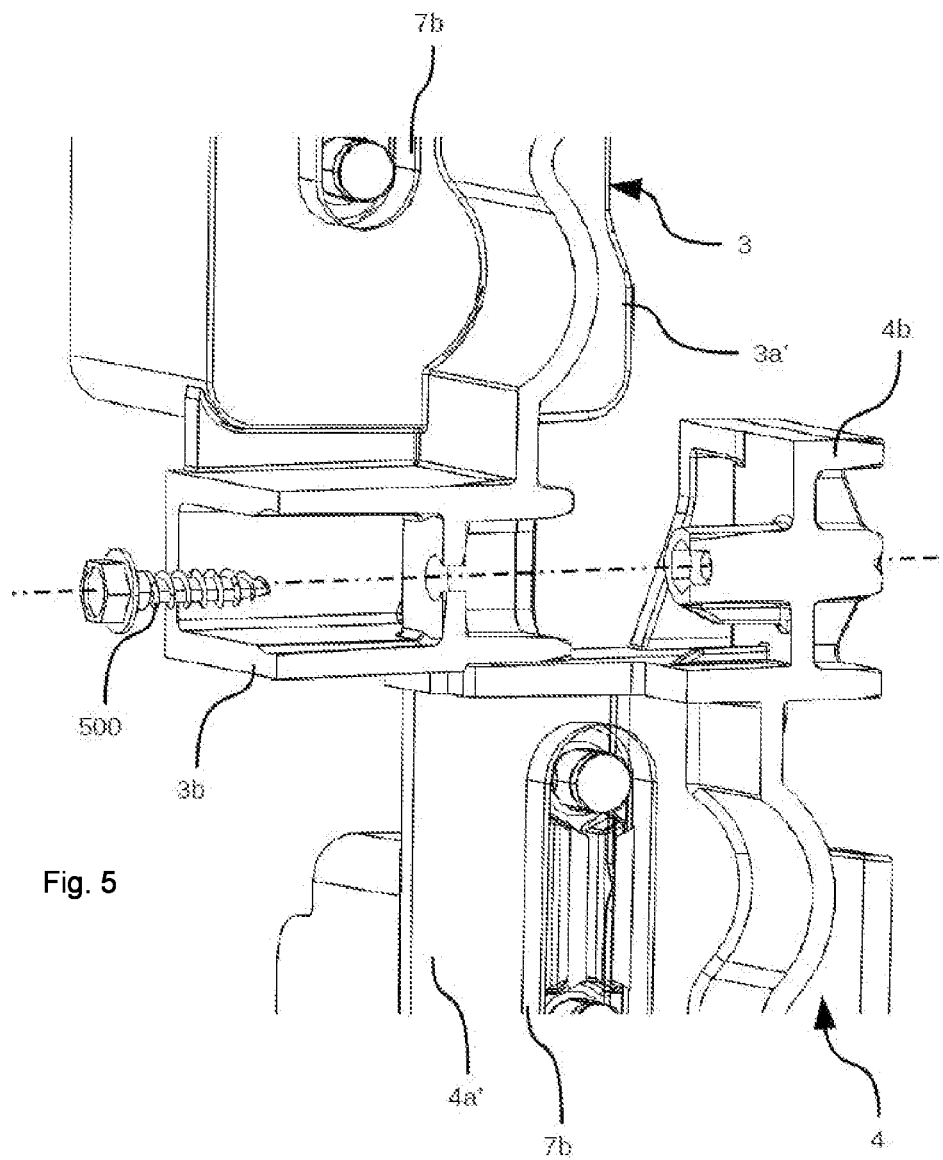
FIG. 5 shows a schematic exploded depiction, in perspective and in section, of the fixing between two support frames.

FIGS. 4 and 5 show the fixing between the two support frames 3 and 4 in greater detail. More particularly, in FIGS. 4 and 5, this involves fixing between the lower end crossmember 3b' of the first support frame 3 and the upper end crossmember 4b of the second support frame 4.

As shown in FIG. 4, the fixing sidewalls 3a, 3a', 3b, 3b' and 4a, 4a', 4b, 4b' of the first 3 and the second 4 support frame have complementary shapes. More specifically, in this case the fixing sidewalls are the lower end crossmember 3b' of the first support frame 3 and the upper end crossmember 4b of the second support frame 4. These complementary shapes notably make it possible for the frames 3, 4 to be properly adjusted in relation to one another and also makes it possible to place them easily.

More specifically, the fixing sidewalls 3a, 3a', 3b, 3b' and 4a, 4a', 4b, 4b' of the first 3 and the second 4 support frame have an interlocking device having a male member 300 complementary to a female member 400. In the example presented, the male member 300 is at least one protruding bead 300 extending parallel to said fixing sidewall 3a, 3a', 3b, 3b' and 4a, 4a', 4b, In this case, this at least one protruding bead 300 is disposed on the fixing sidewall 3a, 3a', 3b, 3b' of the first frame 3, that is to say its lower end crossmember 3b'. Still in the example presented, the female member 400 is at least one receiving recess 400 in which the at least one protruding bead 300 is inserted. In this case, this at least one receiving recess 400 is disposed on the fixing sidewall 4a, 4a', 4b, 4b' of the second frame 4, that is to say its upper end crossmember 4b.

In order to better withstand stresses, notably aerodynamic stresses, when the vehicle is running, the at least one protruding bead 300 is preferably disposed on a front face of the support frame 3, 4 which bears it and the at least one receiving recess 400, for its part, is disposed on a rear face of the support frame 3, 4 which bears it.

As shown in FIG. 5, the fixing sidewalls 3a, 3a', 3b, 3b' and 4a, 4a', 4b, 4b' of the first 3 and the second 4 support frame are fixed to one another by a fixing means opposing one fixing sidewall 3a, 3a', 3b, 3b' and 4a, 4a', 4b, 4b' being pulled out of the other from the rear. More specifically, this fixing means can be screws 500 distributed along the fixing sidewalls 3a, 3a', 3b, 3b' and 4a, 4a', 4b, 4b'. With preference, and in order to protect these screws 500, the latter are screwed in from the rear of the shut-off device 1.

The support frames 3 and 4 can notably have identical dimensions to those of the first support frame 3, as illustrated in FIGS. 1 and 2. What is meant by this is that the lower end crossmembers 4b' and upper end crossmembers 3b, 4b of the first 3 and second 4 support frames are the same size and that the lateral uprights 3a, 3a', 4a, 4a' of the first 3 and second 4 support frames also are the same size.

However, it is entirely possible to imagine that the two support frames 3 and 4 have different dimensions. It is thus possible for the support frames 3 and 4 to have fixing sidewalls 3a, 3a', 3b, 3b' and 4a, 4a', 4b, 4b' that are the same size but other sidewalls 3a, 3a', 3b, 3b' and 4a, 4a', 4b, 4b' that have different dimensions. For example, the support frames 3 and 4 can have an identical width but different heights. The lower end crossmembers 3b', 4b' and upper end crossmembers 3b, 4b of the first 3 and second 4 support frames can thus be the same size and the lateral uprights 3a, 3a' of the first support frame 3 can have a different size to the lateral uprights 4a, 4a' of the second support frame 4.

Figure 6:
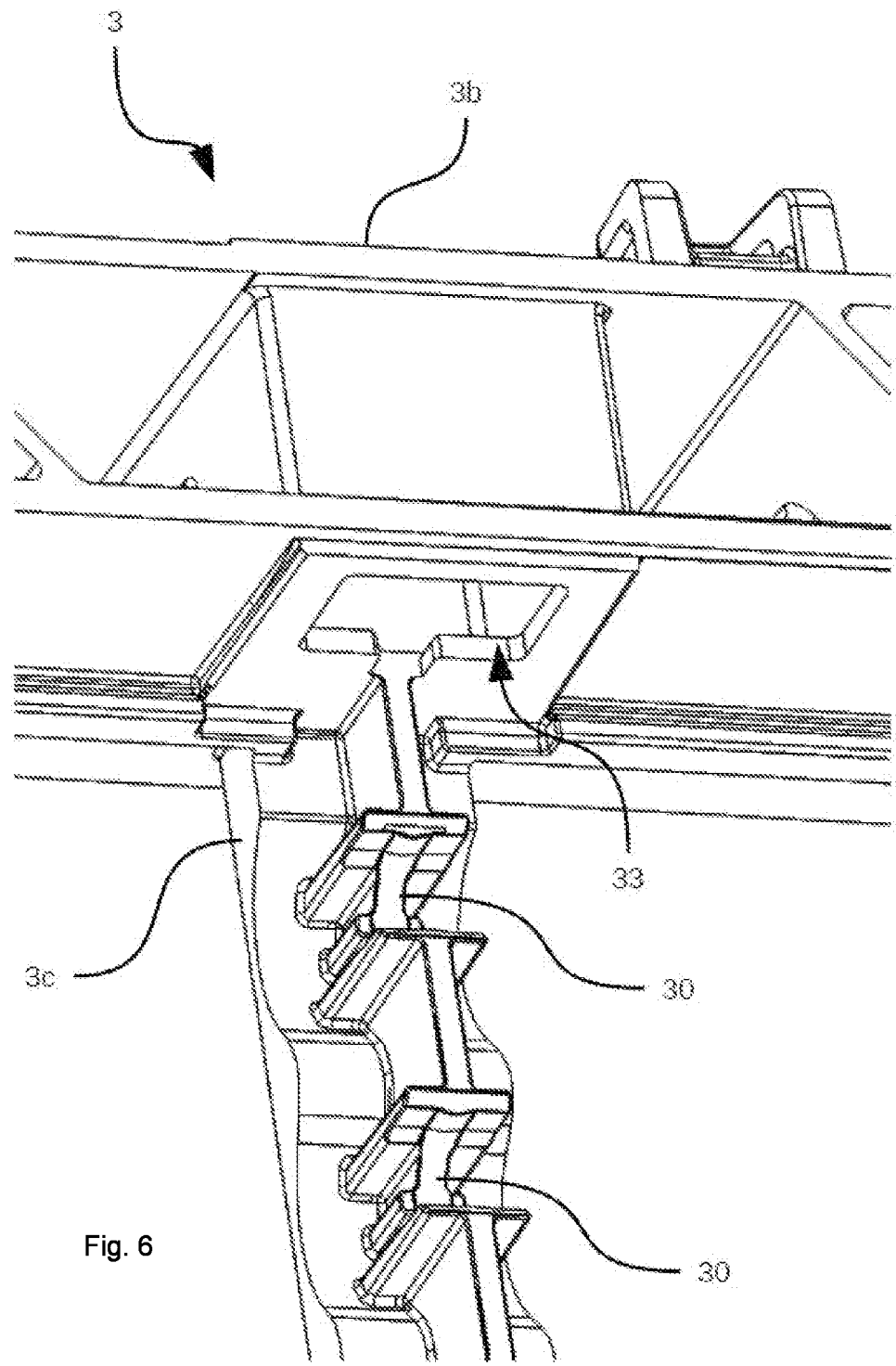
FIG. 6 shows a schematic depiction, in perspective, of an upper portion of support frame and an intermediate upright.
Figure 7:
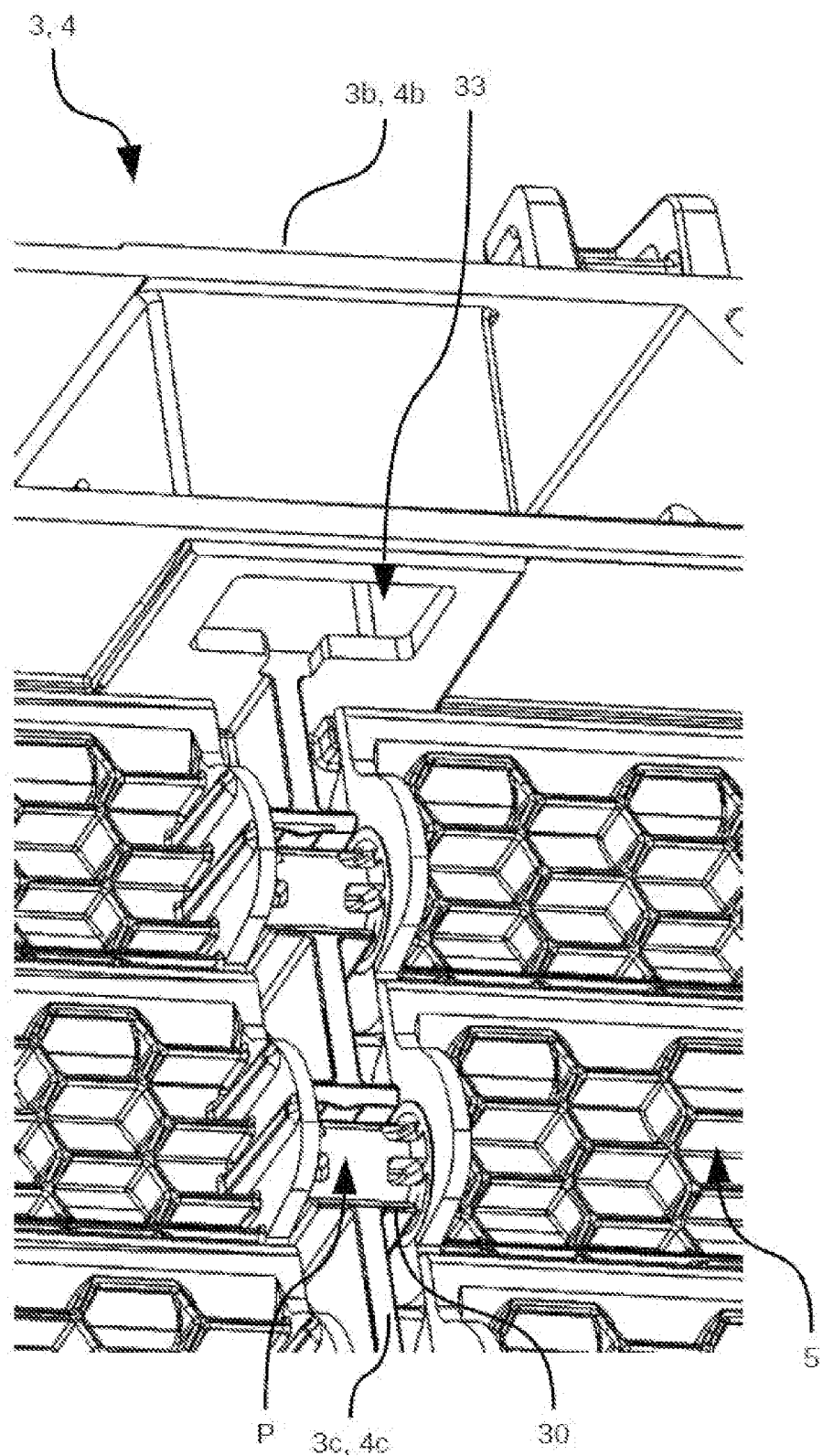
FIG. 7 shows a schematic depiction, in perspective, of the upper portion of support frame and intermediate upright of FIG. 6 with flap.
Figure 8:
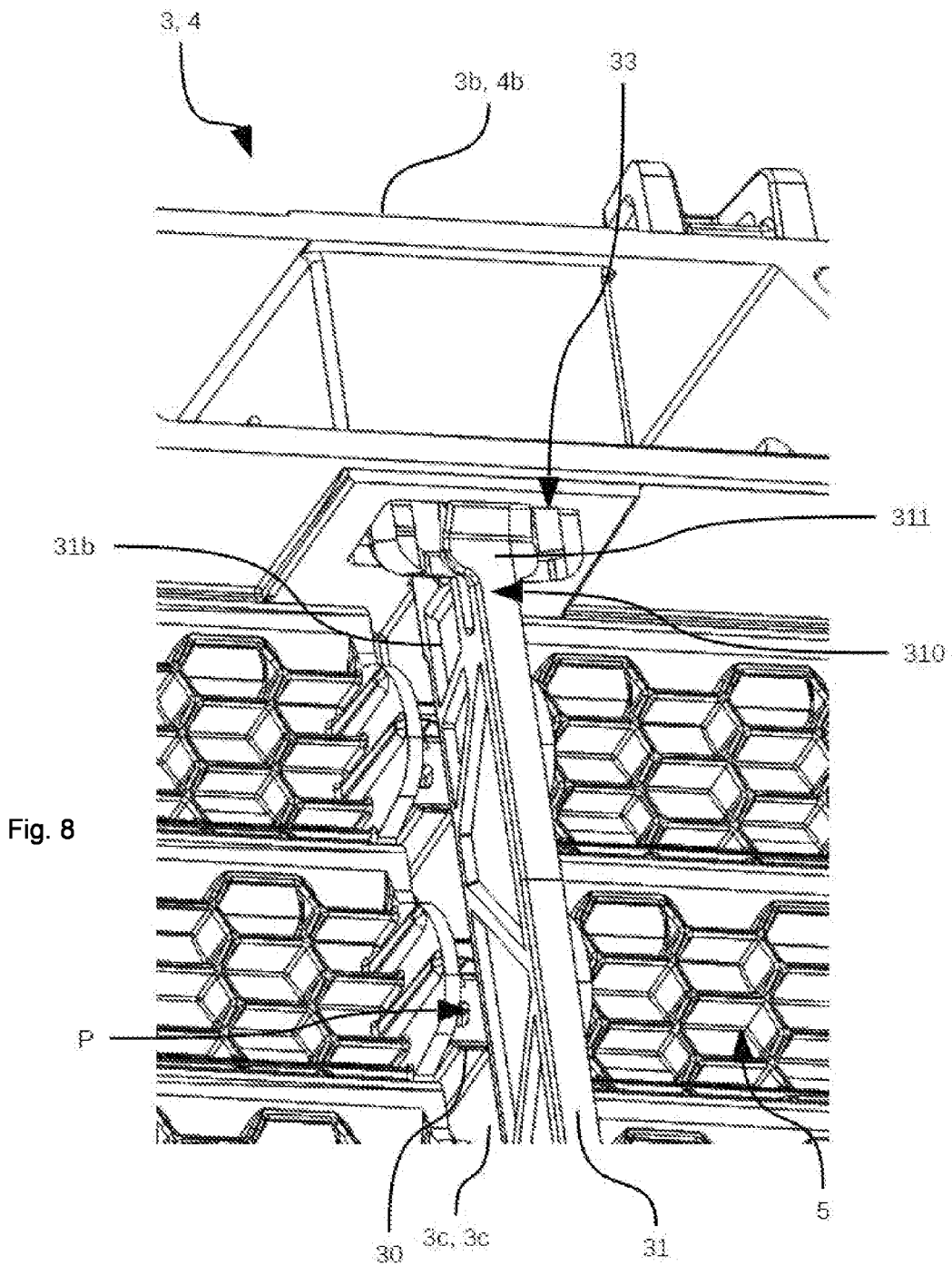
FIG. 8 shows a schematic depiction, in perspective, of the upper portion of support frame and intermediate upright with flaps of FIG. 7 with a retaining bar.

FIGS. 6 to 8 show the pivot connection between the flap(s) 5 and a support frame 3 or 4 in greater detail. In the example illustrated, this involves pivot connections between the flaps 5 and an intermediate upright 3c. However, as mentioned above, this pivot connection can also be with one of the sidewalls 3a, 3a', 3b, 3b' and 4a, 4a', 4b, 4b' of the support frames 3, 4, depending on the configuration and the positioning of the flap(s) 5.

The at least one pivot connection thus has an open insertion recess 30 disposed on one of the faces of the support frames 3, 4 and intended to receive the pivot axis P of the flap(s) 5. As shown in FIGS. 6 and 7, in this case this receiving recess 30 is disposed on an intermediate upright 3c when the flap(s) 5 are disposed parallel to the end crossmembers 3b, 3b', 4b, 4b'. Such a receiving recess 30 can, however, also be present on one or the two lateral uprights 3a, 3a', 4a, 4a' so as to ensure the pivot connection with the flap(s) 5.

The receiving recess 30 is preferably disposed on the rear face of the support frames 3, 4 such that its aperture faces the rear of the motor vehicle in the mounted state. This makes it possible to protect this pivot connection from any debris or dust that could become lodged within the receiving recess and jam the pivot connection, thus potentially preventing the rotation of the flap(s) 5.

Figure 9:
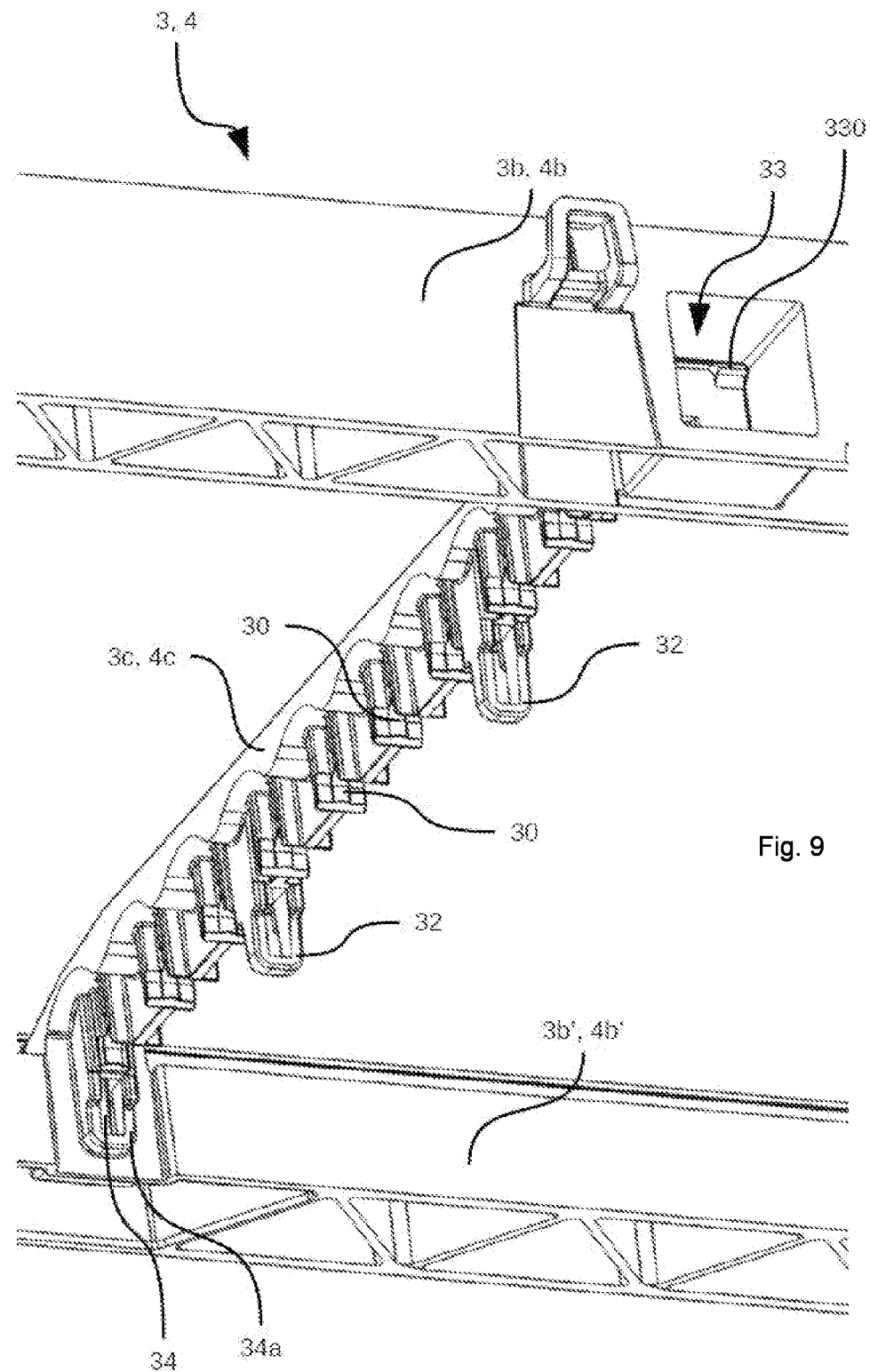
FIG. 9 shows a schematic depiction, in perspective, of a portion of support frame and an intermediate upright with guides.
Figure 10:
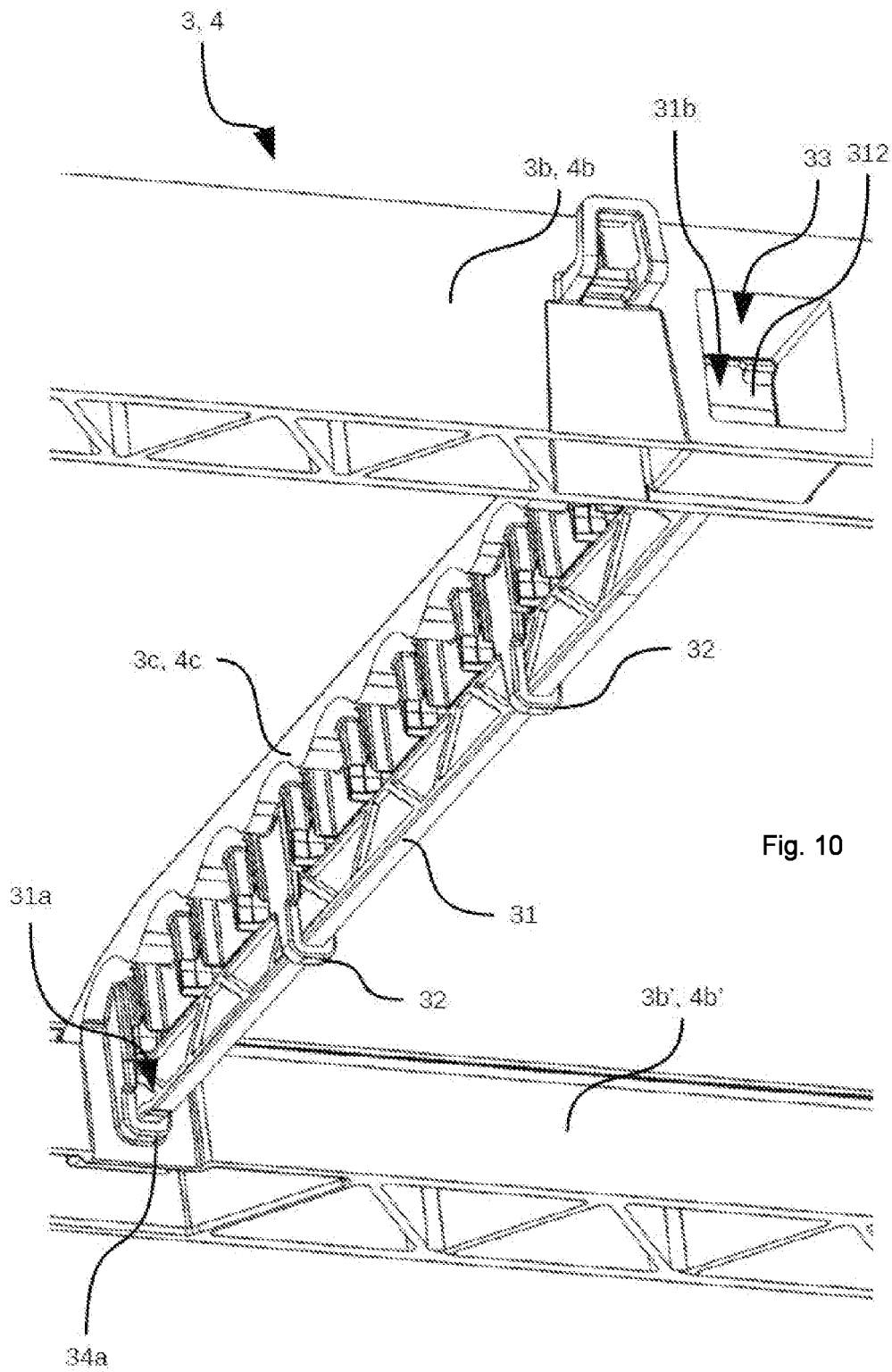
FIG. 10 shows a schematic depiction, in perspective, of the portion of support frame and the intermediate upright with guides of FIG. 9 with a retaining bar.

In order to retain the pivot axis P of the flap 5 within the receiving recess 30, the shut-off device 1 moreover has a retaining bar 31 covering the aperture of the receiving recess 30, as illustrated in FIG. 8. This retaining bar 31 is retained above the aperture of the receiving recess 30 by at least two guides 32 in which said retaining bar 31 is inserted, as illustrated in FIGS. 9 and 10. These guides 32 retain the retaining bar 31 above the aperture of the receiving recess 30 such that the sole degree of freedom of said retaining bar 31 is a sliding movement along the axis defined by the alignment of the guides 32. These guides 32 can more particularly form an arch, on the inside of which the retaining bar 31 is to be inserted. The alignment of the guides 32 preferably follows the alignment of the receiving recesses 30 and is therefore parallel to a sidewall 3a, 3a', 3b, 3b', 4a, 4a', 4b, 4b' and/or intermediate upright 3c, 4c in which the receiving recesses 30 are disposed. In the same way as for the receiving recess(es) 30, the guides 32 are preferably realized on the rear face of the support frames 3, 4.

The guides 32 preferably have a height defined such that the retaining bar 31 presses and retains the pivot axis P against the bottom of the receiving recess 30. Height of the guide 32 is understood in this case more particularly to mean the length of the aperture through which the retaining bar 31 passes between a receiving recess 30 and the protruding end of the guide 32.

Using the guides 32 and a retaining bar 31 makes it possible for the pivot connection to be easily formed during the manufacture of the shut-off device. This is because an operator, after placing the pivot axes P in the receiving recesses 30, only needs a single operation of inserting the retaining bar 31 into the guides 32 to form the pivot connection. In addition, this type of fixing of the flaps 5 is particularly useful and advantageous for large shut-off devices 1, for example for vehicles such as trucks.

In the example illustrated, the guides 32 are disposed on an intermediate upright 3c, 4c, however, as described above, the pivot connection can also be present on one or more lateral uprights 3a, 3a', 4a, 4a'. The same therefore applies to the guides 32, which can also be disposed on at least one of the lateral uprights 3a, 3a', 4a, 4a' when the flap(s) 5 are disposed parallel to the end crossmembers 3b, 3b', 4b, 4b'.

In order to facilitate the manufacturing of the support frames 3, 4 and of the guides 32, the latter can more particularly be made in one piece with said support frames 3, 4. The support frames 3, 4 and the guides 32 can thus, for example, be made of plastics material or composite material and made at the same time during a molding or overmolding step.

The retaining bar 31 can more particularly be inserted in the guides 32 by sliding them from one of the sidewalls 3a, 3a', 3b, 3b', 4a, 4a', 4b, 4b' of the support frames 3, 4. Reference is thus made to an insertion sidewall 3a, 3a', 3b, 3b', 4a, 4a', 4b, 4b'. In the example illustrated, this insertion sidewall 3a, 3a', 3b, 3b', 4a, 4a', 4b, 4b' is the upper end crossmember 3b, 4b. To let the retaining bar 31 pass, the insertion sidewall 3a, 3a', 3b, 3b', 4a, 4a', 4b, 4b' can notably have an insertion aperture 33, visible in FIGS. 6 to 10.

In order to prevent the sliding movement of the retaining bar 31, the sidewall 3a, 3a', 3b, 3b', 4a, 4a', 4b, 4b' opposite the insertion sidewall 3a, 3a', 3b, 3b', 4a, 4a', 4b, 4b', in this case the lower end crossmember 3b', 413', can notably have a stop wall 34 against which a first end 31a of the retaining bar 31 is intended to rest, as illustrated in FIGS. 9 and 10. More specifically, the sidewall 3a, 3a', 3b, 3b', 4a, 4a', 4b, 4b' opposite the insertion sidewall 3a, 3a', 3b, 4a, 4a', 4b, 4b' of the retaining bar 31 can have a recess 34a within which the first end 31a of the retaining bar 31 is to be inserted. The bottom of the recess 34a then forms the stop wall 34. The presence of such a recess 34a makes it possible to lock and retain in place the first end 31a of the retaining bar 31.

According to a first embodiment, notably illustrated in FIGS. 3a and 3b, the first 3 and the second 4 frame each have an individual retaining bar 31. More specifically, according to this first embodiment, the sidewall 3a, 3a', 3b, 3b', 4a, 4a', 4b, 4b' opposite the insertion sidewall 3a, 3a', 3b, 4a, 4a', 4b, 4b' of each support frame 3, 4, in this case the lower end crossmembers 3b' and 4b', have a stop wall 34 against which the first end 31a of the individual retaining bar 31 on each support frame 3, 4 is intended to rest.

According to a second embodiment, notably illustrated in FIG. 3c, the retaining bar 31 is shared by the first 3 and second 4 frames. This shared retaining bar 31 also makes it possible to reinforce the mutual fixing and the alignment of the support frames 3, 4. More specifically, according to this second embodiment, the shared retaining bar 31 passes through the fixing sidewalls 3a, 3a', 3b, 4a, 4a', 4b, 4b' via which the first 3 and the second 4 frame are fixed to one another. The shared retaining bar 31 is then inserted for example at the insertion sidewall 3a, 3a', 3b, 3b' of the first support frame 3, in this case its upper end crossmember 3b, passes through the fixing sidewalls 3a, 3a', 3b, 3b', 4a, 4a', 4b, 4b', in this case the lower end crossmember 3b' of the first support frame 3 and the upper end crossmember 4b of the second support frame 4. The shared retaining bar 31 abuts the sidewall 4a, 4a', 4b, 4b' that is opposite the fixing sidewall 4a, 4a', 4b, 4b' of the second support frame 4, in this case its lower end crossmember 4b'.

In order to avoid the retaining bar 31 being able to come out through the insertion aperture 33, a second end 31b of the retaining bar 31, opposite the first end that is intended to rest against the stop wall 34, can have an elastic tongue 310 with a free end 311, as illustrated in FIG. 8. This free end 311 is notably intended to bear against the inner face of the insertion sidewall 3a, 3a', 3b, 4a, 4a', 4b, 4b', in this case the upper end crossmember 3b, 4b. Inner is understood in this case to mean that face of the insertion sidewall 3a, 3a', 3b, 4a, 4a', 4b, 4b' that faces the inside of the support frame 3, 4. This positioning means that the elastic tongue 310 opposes the removal of the retaining bar 31 through the insertion aperture 33.

Figure 11:
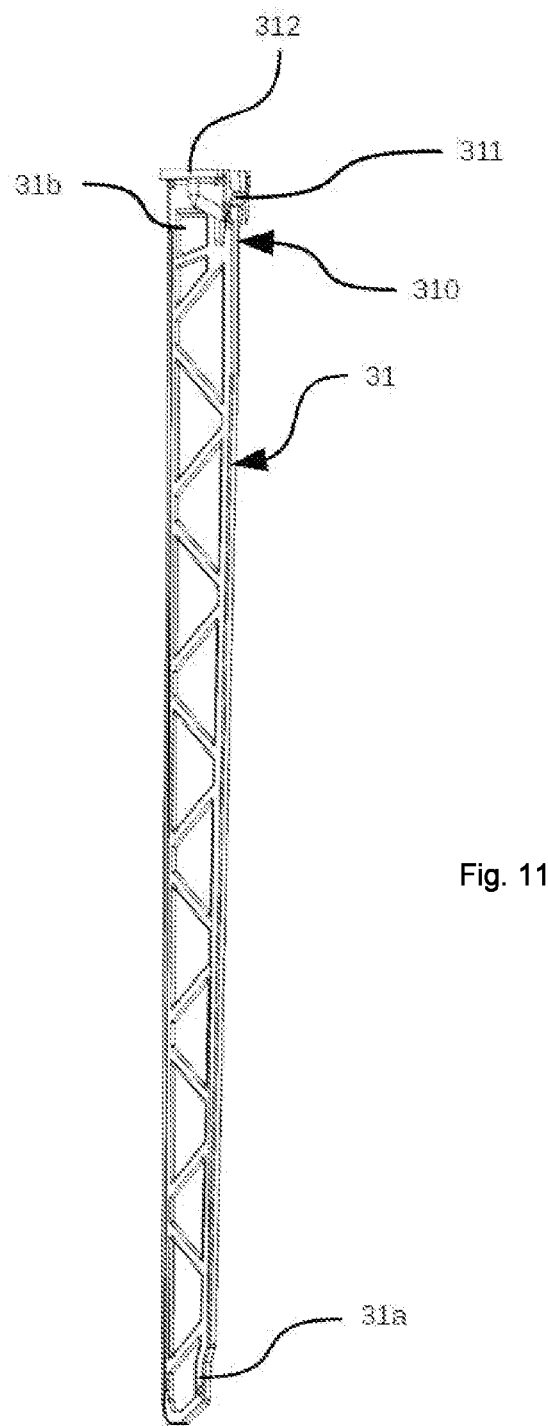
FIG. 11 shows a schematic depiction, in perspective, of a retaining bar.

The second end 31b of the retaining bar 31 can also have a retaining flange 312, visible in FIGS. 10 and 11. This retaining flange 312 can notably have a complementary shape to the insertion aperture 33 in order to retain this second end. The insertion aperture 33, for its part, can have at least one stop 330 (visible in FIG. 9) against which the retaining flange 312 is intended to rest.

By way of this simple fixing system, the retaining bar 31 is automatically fixed after it has been placed without it being necessary for an operator to perform a dedicated fixing step.

FIG. 11 shows a retaining bar 8 in more detail and as a whole. This retaining bar 31 can notably be made of plastics material, for example by molding. The retaining bar 31 can notably have its first end 31a intended to be slid first, having a width less than its second end 31b, which is opposite the first end 31a. Width of the retaining bar 31 is understood in this case to mean the distance between that portion of the retaining bar that is intended to face the receiving recesses 30 and its opposite portion. As a result, the height of the guides 32 is matched to this particular shape such that the retaining bar 31 presses and retains the pivot axis P against the bottom of the receiving recess 30. Thus, in the example illustrated in FIGS. 9 and 10, a "lower" guide 32, that is to say one which is close to the lower end crossmember 3b', 4b', will have a height less than the height of an "upper" guide 32, that is to say one which is close to the upper end crossmember 3b, 4b.

Thus, it will be clearly seen that, by way of the presence of two support frames 3, 4 which are mechanically fixed to one another and each of which has a dedicated drive device 7 for pivoting the flaps 5, the shut-off device 1 enables easier mounting and also more optimum control of the flaps for better performance, both in terms of the circulation of air toward heat exchangers and in terms of the aerodynamics of the motor vehicle.

What is claimed is:

1. A shut-off device for an air intake for a motor vehicle front end, comprising:
    a first support frame having four sidewalls,
    a second support frame having four sidewalls,
        at least one flap disposed within each of the first and the second support frames, the at least one flap being able to pivot about a pivot axis between a first, open, end position and a second, closed, end position,
        the first and the second support frames being mechanically fixed directly to one another at one of their sidewalls, referred to as a fixing sidewall,
        the first and the second support frames each having at least one drive device dedicated to moving the at least one flap.

2. The shut-off device as claimed in claim 1, wherein the first and the second support frames each have two lateral uprights, an upper end crossmember and a lower end crossmember, the upper and the lower end crossmembers connecting the two lateral uprights, the lower end crossmember of the first support frame being fixed directly to the upper end crossmember of the second support frame.

3. The shut-off device as claimed in claim 2, wherein the at least one drive device has an actuator disposed on a lower part of one of the lateral uprights of the first and the second support frames.

4. The shut-off device as claimed in claim 2, wherein the at least one drive device has an actuator disposed on a intermediate part of one of the lateral uprights of the first and the second support frames.

5. The shut-off device as claimed in claim 2, wherein the at least one drive device has an actuator disposed on a upper part of one of the lateral uprights of the first and the second support frames.

6. The shut-off device as claimed in claim 1, wherein the fixing sidewall of the first and the second support frames have complementary shapes.

7. The shut-off device as claimed in claim 1, wherein the fixing sidewall of the first and the second support frames have an interlocking device having a male member complementary to a female member.

8. The shut-off device as claimed in claim 1, wherein the fixing sidewall of the first and the second support frames are fixed to one another by a fixing component piercing them through.

9. The shut-off device as claimed in claim 1, wherein the at least one flap is connected to the first and the second support frames by at least one pivot connection having an open receiving recess disposed on one of the faces of the first and the second support frames and intended to receive the at least one pivot connection of the at least one flap, the shut-off device further comprising:
a retaining bar which covers an aperture of the open receiving recess and is intended to retain the at least one pivot connection of the at least one flap within the open receiving recess; and
at least two guides which are aligned and disposed so as to retain the retaining bar above the aperture of the open receiving recess, the retaining bar being inserted in the at least two guides by sliding it from one of the four sidewalls of the first and the second support frames.

10. The shut-off device as claimed in claim 9, wherein the retaining bar is shared by the first and the second support frames.

* * * * *